United States Patent
Gifford et al.

(10) Patent No.: US 12,189,377 B2
(45) Date of Patent: Jan. 7, 2025

(54) CONTINOUS MONITORING, ADVANCE ALERTS, AND CONTROL OF KEY PERFORMANCE INDICATOR VARIABLES

(71) Applicant: International Business Machines Corporation, Armonk, NY (US)

(72) Inventors: Wesley M. Gifford, Ridgefield, CT (US); Dharmashankar Subramanian, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 336 days.

(21) Appl. No.: 17/177,434

(22) Filed: Feb. 17, 2021

(65) Prior Publication Data
US 2022/0260977 A1   Aug. 18, 2022

(51) Int. Cl.
  *G05B 19/418* (2006.01)
  *G01F 15/06* (2022.01)
  *G01F 15/075* (2006.01)

(52) U.S. Cl.
  CPC ..... *G05B 19/41875* (2013.01); *G01F 15/068* (2013.01); *G01F 15/0755* (2013.01); *G05B 19/4183* (2013.01); *G05B 19/41865* (2013.01)

(58) Field of Classification Search
None
See application file for complete search history.

(56) References Cited

U.S. PATENT DOCUMENTS

| | | | |
|---|---|---|---|
| 6,408,259 B1 | 6/2002 | Goebel et al. | |
| 6,748,334 B1 * | 6/2004 | Perez | G01N 33/0016 702/24 |
| 7,369,697 B2 | 5/2008 | Starikov | |
| 8,121,817 B2 | 2/2012 | Landells et al. | |
| 8,224,473 B2 | 7/2012 | Selvaraj et al. | |

(Continued)

FOREIGN PATENT DOCUMENTS

| | | | | |
|---|---|---|---|---|
| CA | 3114183 A1 * | 4/2020 | ............. | G06F 15/16 |
| CN | 108983731 A | 12/2018 | | |

(Continued)

OTHER PUBLICATIONS

Fernandez et al, "Neural Network and Trend Prediction for Technological Processes Monitoring". MICAI 2005: Advances In Artificial Intelligence, vol. 3789, pp. 731-740, 2005. 10 pages.

(Continued)

*Primary Examiner* — Shelby A Turner
*Assistant Examiner* — Brandon J Becker
(74) *Attorney, Agent, or Firm* — Cantor Colburn LLP; James Olsen

(57) ABSTRACT

Embodiments of the invention are directed to collecting, by a computer system, sensor data of a manufacturing system, the sensor data being measured at intervals smaller than a time interval of a target measurement of the manufacturing system. The sensor data is determined to have a relationship to the target measurement. A synthetic target measurement is generated at an interval smaller than the time interval based on the relationship. An advance warning is automatically generated for the target measurement based on the synthetic target measurement within the interval smaller than the time interval.

17 Claims, 9 Drawing Sheets

(56) References Cited

U.S. PATENT DOCUMENTS

| | | | | |
|---|---|---|---|---|
| 2006/0158956 | A1* | 7/2006 | Laugharn | B01J 19/008 366/127 |
| 2007/0027568 | A1* | 2/2007 | Good | G05B 19/41875 700/121 |
| 2013/0335731 | A1* | 12/2013 | Jorden | G01N 33/18 356/73 |
| 2013/0339919 | A1* | 12/2013 | Baseman | G05B 19/41875 716/136 |
| 2014/0344007 | A1 | 11/2014 | Shende et al. | |
| 2017/0277174 | A1* | 9/2017 | Maeda | G05B 19/41875 |
| 2017/0351241 | A1 | 12/2017 | Bowers et al. | |
| 2019/0227504 | A1 | 7/2019 | Zhao et al. | |
| 2019/0340843 | A1* | 11/2019 | McCarson | G06F 18/24 |
| 2023/0102048 | A1* | 3/2023 | Cella | B25J 9/1661 700/248 |

FOREIGN PATENT DOCUMENTS

| | | | | |
|---|---|---|---|---|
| EP | 2132605 B1 | 8/2015 | | |
| WO | 2014035432 A2 | 3/2014 | | |
| WO | WO-2019218097 A1 | * 11/2019 | | B60C 23/04 |
| WO | 2020227429 A1 | 11/2020 | | |

OTHER PUBLICATIONS

Zhang et al. "An adaptive pre-warning method based on trend monitoring: Application to an oil refining process". Journal of the International Measurement Confederation, vol. 139, pp. 163-176, 2019. 14 pages.

International Search Report; International Application No. PCT/CN2022/076333; International Filing Date: Feb. 15, 2022; Date of mailing: Apr. 26, 2022; 9pages.

* cited by examiner

CONTINOUS MONITORING, ADVANCE ALERTS, AND CONTROL OF KEY PERFORMANCE INDICATOR VARIABLES

BACKGROUND

The present invention generally relates to computer systems, and more specifically, to computer-implemented methods, computer systems, and computer program products configured and arranged for providing continuous monitoring, advance alerts, and control of process key performance indicator variables that have infrequent and time-aggregated measurements.

Manufacturing is the production of products for use or sale, using labor and machines, tools, and chemical or biological processing or formulation. Manufacturing can include a range of activities, from mechanical to high-tech, but is applied to industrial design, in which raw materials including chemicals from the primary sector are transformed into finished goods on a large scale. Moreover, a manufacturing process includes the steps through which raw materials are transformed into a final product. The manufacturing process begins with the product design and materials specification from which the product is made. These materials are then modified through manufacturing processes to become the required part. Modern manufacturing includes all intermediate processes required in the production and integration of a product's components. Although samples or products can be tested in a time-series aggregate manner to check quality, samples or products of the manufacturing process need to be tested in a more granular manner to enable early identification of potential issues prior to the normal measurement.

SUMMARY

Embodiments of the present invention are directed to computer-implemented methods for providing continuous monitoring, advance alerts, and control of process key performance indicator variables that have infrequent and time-aggregated measurements. A non-limiting example computer-implemented method includes collecting, by a computer system, sensor data of a manufacturing system. The sensor data is measured at intervals smaller than a time interval of a target measurement of the manufacturing system. The sensor data is determined to have a relationship to the target measurement. The computer-implemented method includes generating, by the computer system, a synthetic target measurement at an interval smaller than the time interval based on the relationship. Also, computer-implemented method includes automatically generating, by the computer system, an advance warning for the target measurement based on the synthetic target measurement within the interval smaller than the time interval.

In addition to one or more of the features described above or below, the computer-implemented method provides improvements over known methods for monitoring/key performance indicator variables that have infrequent and time-aggregated measurements by generating a synthetic target measurement at an interval smaller than the normal target measurement. Accordingly, the above-described computer-implemented method efficiently provides an early warning indication about a target sample prior to the normal measurement process, thereby enabling early identification and mitigation of potential issues. Furthermore, the frequency of the target measurement is often not under the control of the system designer, for example, because it is too costly or impossible to conduct the target measurement more quickly.

In addition to one or more of the features described above or below, or as an alternative, further embodiments of the invention could include where one or more set points associated with the manufacturing system are automatically revised in response to the advance warning for the target measurement based on the synthetic target measurement.

In addition to one or more of the features described above or below, the computer-implemented method provides improvements over known methods for monitoring/key performance indicator variables that have infrequent and time-aggregated measurements by adjusting set points based on the synthetic target measurement but prior to the normal measurement process.

In addition to one or more of the features described above or below, or as an alternative, further embodiments of the invention could include where one or more control components associated with the manufacturing system are automatically revised in response to the advance warning for the target measurement based on the synthetic target measurement.

In addition to one or more of the features described above or below, the computer-implemented method provides improvements over known methods for monitoring/key performance indicator variables that have infrequent and time-aggregated measurements by adjusting control components based on the synthetic target measurement but prior to the normal measurement process.

In addition to one or more of the features described above or below, or as an alternative, further embodiments of the invention could include where the advance warning is generated in response to the synthetic target measurement being outside a predetermined range.

In addition to one or more of the features described above or below, the computer-implemented method provides improvements over known methods for monitoring/key performance indicator variables that have infrequent and time-aggregated measurements by enabling an advance warning based on the synthetic target measurement which is prior to the normal measurement process.

In addition to one or more of the features described above or below, or as an alternative, further embodiments of the invention could include where modifications are made to the manufacturing system to bring the synthetic target measurement within a predetermined range.

In addition to one or more of the features described above or below, the computer-implemented method provides improvements over known methods for monitoring/key performance indicator variables that have infrequent and time-aggregated measurements by making changes to the manufacturing system based on the synthetic target measurement which is prior to the normal measurement process.

In addition to one or more of the features described above or below, or as an alternative, further embodiments of the invention could include where the target measurement is a quality-related variable corresponding to a physical material process outflow stream of the manufacturing system. The target measurement includes a non-instantaneous, time-aggregated nature due to mixing equal sampled volumes in a vessel where the equal sampled volumes are collected at multiple instants in time throughout the time interval and measured at an end of the time interval, thereby obtaining the target measurement.

In addition to one or more of the features described above or below, the computer-implemented method provides improvements over known methods for monitoring/key performance indicator variables that have infrequent and time-aggregated measurements by generating the synthetic target measurement as an instantaneous measurement which is prior to target measurement which non-instantaneous, time-aggregated in nature.

In addition to one or more of the features described above or below, or as an alternative, further embodiments of the invention could include wherein the target measurement is a composite measurement of an aggregated total volume of a sample. The synthetic target measurement is a generated value for a point in time based on the sensor data and is not a measurement of the aggregated total volume of the sample, the synthetic target measurement representing a state of an individual sampled volume at the point in time within the time interval.

In addition to one or more of the features described above or below, the computer-implemented method provides improvements over known methods for monitoring/key performance indicator variables that have infrequent and time-aggregated measurements by not relying on the composite measurement of the aggregated total volume of the sample. Rather, the synthetic target measurement uses sensor data to represent a state of an individual sampled volume at any given point in time.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide computer-implemented methods, computer systems, and computer program products for determining and/or inferring a synthetic/estimated quality measurement about a target sample from available sensor data. One or more embodiments generate the synthetic/estimated quality measurement about a target sample from available sensor data prior to the normal measurement of interest. Accordingly, one or more embodiments of the present invention provide an early indication about a target sample prior to the normal measurement process, thereby enabling early identification and mitigation of potential issues.

The measurement of interest, which is the quality measurement, is collected periodically at some consistent frequency. There is knowledge about how the target sample, which is the subject of the target measurement, is collected and measured. The system of interest, for example, a manufacturing system, is instrumented with a variety of sensors that collect data at a much higher frequency than the time-aggregated quality measurement of the target sample. One or more embodiments of the invention improve timeliness of knowledge about the output quality of the target sample via the synthetic/estimated quality measurement without conducting any more measurements in the manufacturing system.

Figure 1:
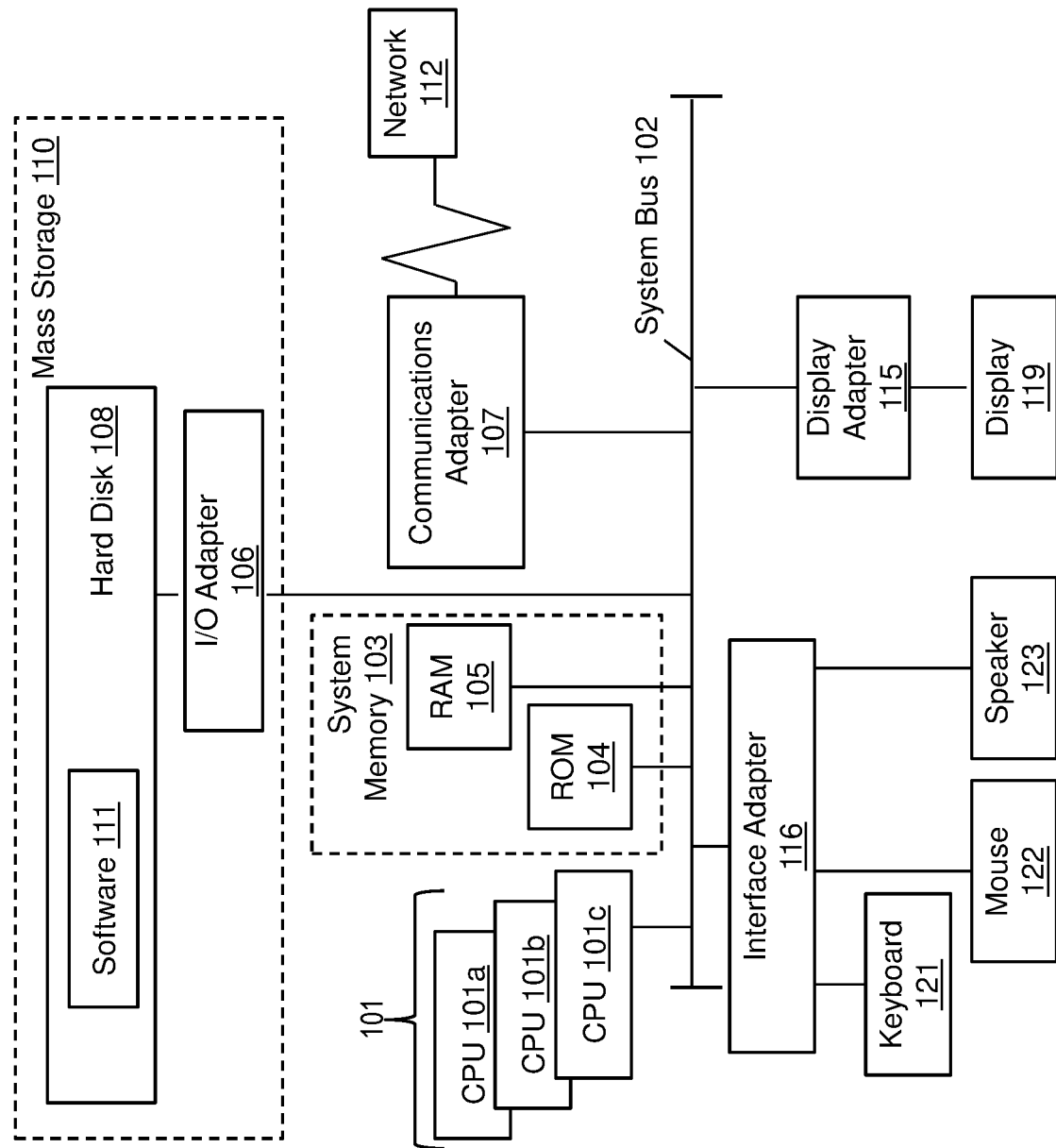
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 can be, for example, a server, desktop computer, laptop computer, tablet computer, or smartphone. In some examples, computer system 100 can be a cloud computing node. Computer system 100 can be described in the general context of computer system executable instructions, such as program modules, being executed by a computer system. Generally, program modules can include routines, programs, objects, components, logic, data structures, and so on that perform particular tasks or implement particular abstract data types. Computer system 100 can be practiced in distributed cloud computing environments where tasks are performed by remote processing devices that are linked through a communications network. In a distributed cloud computing environment, program modules can be located in both local and remote computer system storage media including memory storage devices.

As shown in FIG. 1, the computer system 100 has one or more central processing units (CPU(s)) 101*a*, 101*b*, 101*c*, etc., (collectively or generically referred to as processor(s)

101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and can include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 can be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 can be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which can be an outside network, enabling the computer system 100 to communicate with other such systems. In one embodiment, a portion of the system memory 103 and the mass storage 110 collectively store an operating system, which can be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 can be connected to one or more I/O buses that are connected to the system bus 102 via an intermediate bus bridge (not shown). A display 119 (e.g., a screen or a display monitor) is connected to the system bus 102 by the display adapter 115, which can include a graphics controller to improve the performance of graphics intensive applications and a video controller. A keyboard 121, a mouse 122, a speaker 123, etc., can be interconnected to the system bus 102 via the interface adapter 116, which can include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 can be a cellular network, a radio network, a wide area network (WAN), a local area network (LAN), or the Internet, among others. An external computing device can connect to the computer system 100 through the network 112. In some examples, an external computing device can be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 can be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
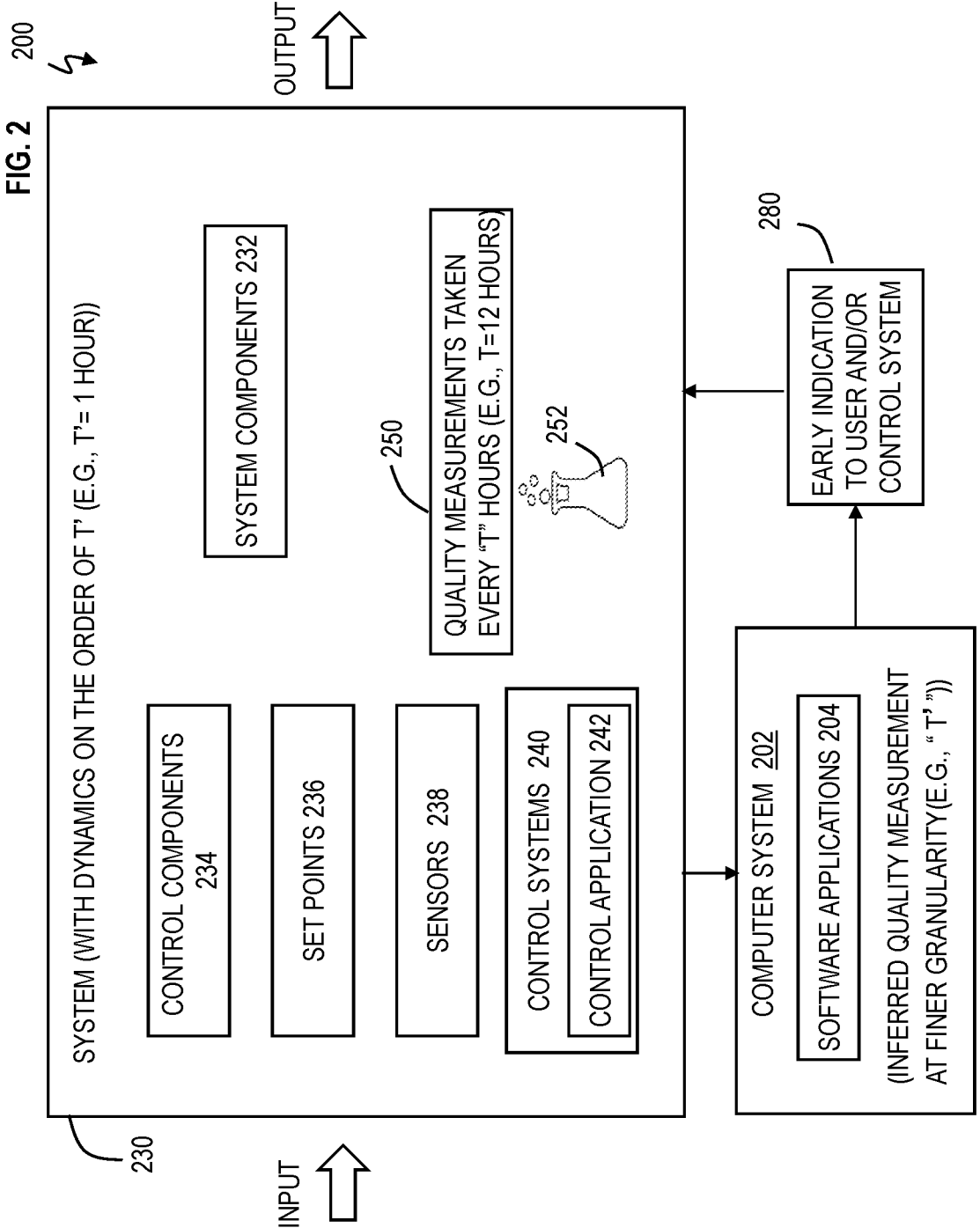
FIG. 2 depicts a block diagram of a system for providing continuous monitoring, advance alerts, and control of process key performance indicator variables that have infrequent and time-aggregated measurements in accordance with one or more embodiments of the present invention.

FIG. 2 is a block diagram of a system 200 for providing continuous monitoring, advance alerts, and control of process key performance indicator variables that have infrequent and time-aggregated measurements in accordance with one or more embodiments of the present invention. System 200 includes one or more computer systems 202 connected to a manufacturing system 230. Manufacturing system 230 can operate using control theory which uses control dynamical systems in engineered processes and machines. Manufacturing system 230 can utilize automatic process control in continuous production processes. Automatic process control is a combination of control engineering and chemical engineering disciplines that uses industrial control systems to achieve a production level of consistency, economy, and safety and is implemented widely in industries such as oil refining, pulp and paper manufacturing, chemical processing, power generating plants, etc. Manufacturing system 230 can include various system components 232 in which the system components 232 represent various pieces of equipment utilized to transform the input into the targeted output, as known by one skilled in the art. System components 232 can include electrical equipment, mechanical equipment, chemical equipment, etc. System components 232 represent the machines or machinery required to function as a manufacturing system 230 and/or plant.

Manufacturing system 230 includes control components 234 (or controllers) used to control the functioning of system components 232. Control components 234 relate to anything capable of being controlled to be changed and/or modified in manufacturing system 230. Example control components 234 can include actuators, control values, relays, switches, etc. Set points 236 (also setpoints) are used in manufacturing system 230. A set point is the desired or target value for an essential variable or process value of manufacturing system 230. Control components 234 can include one or more set points 236 which control operation of the respective control components 234. Set points 236 can be modified to change the operation and settings of control components 234. One or more control systems 240 are in manufacturing system 230. Control systems 240 are used to control the functioning and operation of control components 234 thereby controlling the functioning and operation of system components 232. Control systems 240 can be utilized to modify set points 236 for manufacturing system 230. A control system manages, commands, directs, and/or regulates the behavior of other devices or systems (such as, for example, control components 234) using control loops. For continuously modulated control, a feedback controller is used to automatically control a process or operation. The control system compares the value or status of the process variable being controlled with the desired value or set point and applies the difference as a control signal to bring the process variable output of the plant (e.g., manufacturing system 230) to the same value as the set point.

In manufacturing system 230, a quality measurement 250 is taken of the target product which could be at any desired stage in fabrication. The quality measurement 250 is the measurement of interest, and the quality measurement 250 is collected periodically at some consistent frequency from an output of a given one of system components 232. For example, quality measurements can be taken every "T" hours (e.g., T=12 hours, 24 hours, 1 week, etc.). In process industries, the quality of output products is to be maintained, which can include ensuring that any regulatory constraints are being met including federal standards set by a governing entity. Frequently, this is done by periodically performing a costly and time-consuming laboratory measurement based on an aggregate sample collected over time. Depending on the outcome of the laboratory measurement, the target product may be of insufficient quality, and/or a violation of regulatory constraints may have occurred. Either case is a costly error. Accordingly, quality measurement 250 is taken to meet the given requirement. Quality measurement 250 is a true aggregate measurement. For example, quality measurement 250 is based on the combination of small volumes collected over time (e.g., from a system component 232) and combined in the same sample container 252. Therefore, a single quality measurement 250 is composed of time-aggregated measurements of the sample/target product in sample container 252, where the sample in sample container 252 is a time-aggregate sample. Subsequent measurement of the time-aggregated quantity in the sample container 252 also adds additional delay.

Manufacturing system 230 is instrumented with a variety of sensors 238 coupled to system components 232, and sensors 238 measure (i.e., collect) data at a much higher frequency than the measurement of quality measurement 250. Control systems 240 can be coupled to sensors 238 and receive the measurements (i.e., sensor data) from sensors 238. Sensor measurements can be measured every T' increments of time (e.g., minutes), where T' is less than T. For example, sensor measurements by sensors 238 could be measured/taken every five minutes, ten minutes, etc. Sensor measurement by sensors 238 could be measured/taken every hour, two hours, etc. The sensor measurements of sensors 238 do not measure the actual sample collected in sample container 252. Rather, sensors 238 can provide measurements and readings of various pieces of equipment, materials, flows, etc., at various/different stages of the manufacturing process to produce the sample in sample container 252. Sensor measurements and readings can be for any type of measurable value in and/or related to manufacturing system 230. For example, sensor measurements and readings can be for ore quality, temperature, density, flow rate, voltage, current, speed, revolution-per-minute, vibration, and so forth.

Figure 3:
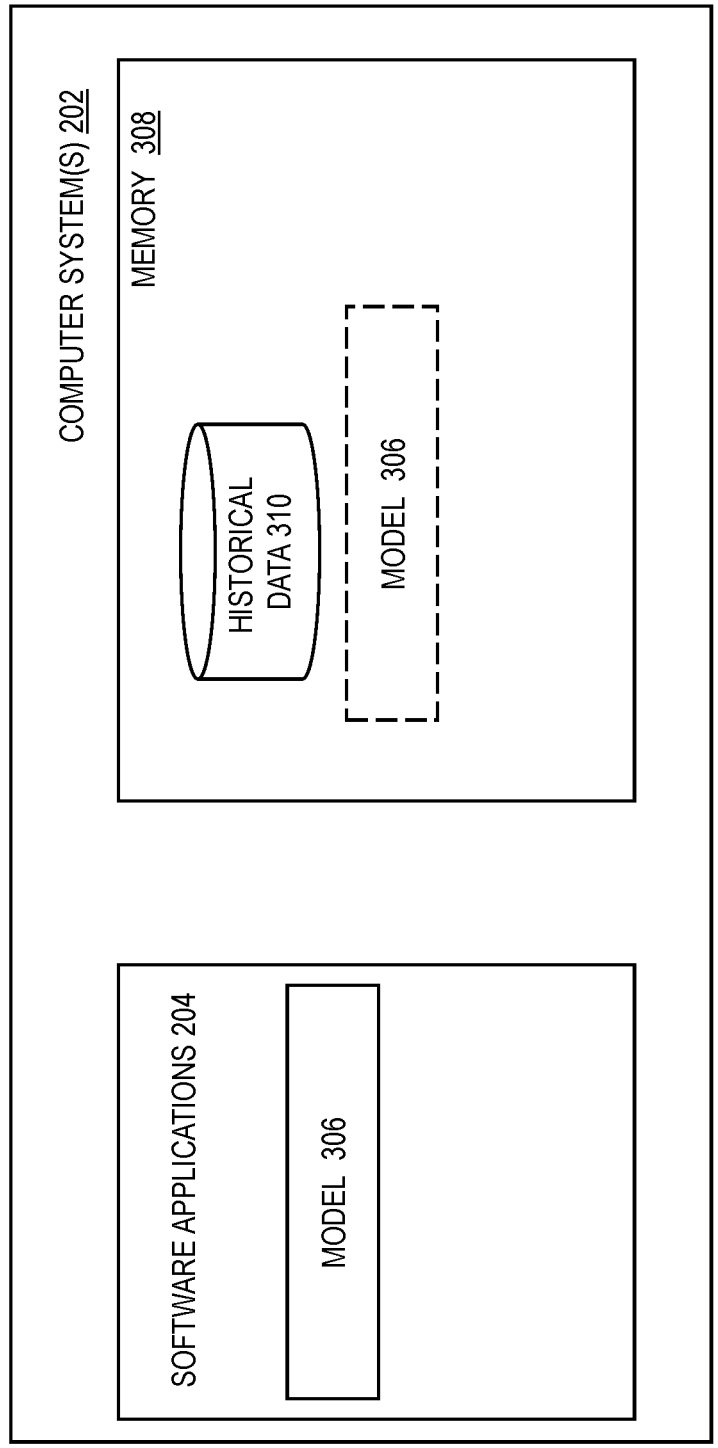
FIG. 3 depicts further details of a computer system in FIG. 2 in accordance with one or more embodiments of the present invention.

A computer system 202 is connected to manufacturing system 230. Computer system 202 can be coupled to control systems 240, sensors 238, control components 234, and/or set points 236. In one or more embodiments, control systems 240 can include one or more control applications 242 configured to interface with software applications 204 of computer system 202. Also, control applications 242 can monitor and control system components, control components 234, set points 236, and sensors 238 as understood by one skilled in the art. Further details of computer system 202 are illustrated in FIG. 3. In one or more embodiments, computer system 202 can be implemented and/or integrated in control system 240. Software applications 204 can be implemented as software 111 executed on one or more processors 101, as discussed in FIG. 1. Similarly, control applications 242 can be implemented using software 111 configured to execute on one or more processors 101. Elements of computer system 100 can be used in and/or integrated into computer system 202 and control systems 240.

Figure 4:
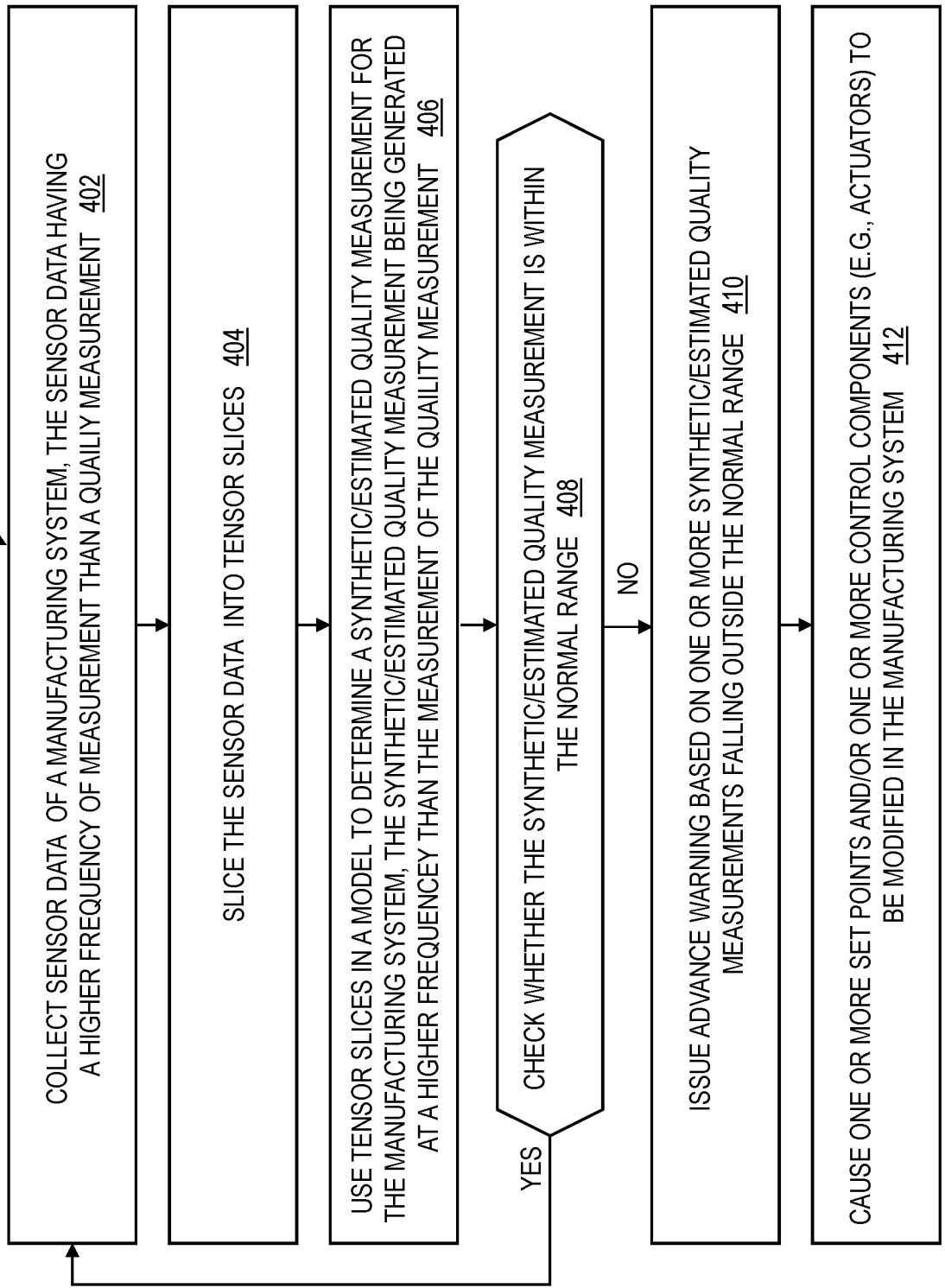
FIG. 4 depicts a flowchart of a computer-implemented process for continuous monitoring, advance alerts, and control of process key performance indicator variables that have infrequent and time-aggregated measurements in a manufacturing system in accordance with one or more embodiments of the present invention.

FIG. 4 depicts a flowchart of a computer-implemented process 400 providing continuous monitoring, advance alerts, and control of process key performance indicator variables that have infrequent and time-aggregated measurements in a manufacturing process in accordance with one or more embodiments of the invention. The computer-implemented process 400 in FIG. 4 can be implemented using system 200 shown in FIG. 2, and computer system 202 in FIG. 3. Accordingly, the computer-implemented process 400 will now be described with reference to system 200 and computer systems 202 in FIG. 2.

At block 402, software applications 204 of computer system 202 are configured to collect sensor data of sensors 238 in manufacturing system 230. Sensor data of sensors 238 is measured at a higher frequency (e.g., measured at intervals or time T' shorter) than measurement of quality measurement 250 (e.g., measured at interval or time "T"). In one or more embodiments, software applications 204 can receive sensor data of sensors 238 from control application 242 of control systems 240. Sensor data of sensors 238 can be pushed to and/or pulled by software applications 204 of computer system 202. In one or more embodiments, control systems 240 may buffer and/or store sensor data for respective sensors 238 prior to sending the sensor data to computer system 202. In one or more embodiments, software applications 204 can receive sensor data of sensors 238 in real-time and/or near real-time.

At block 404, software applications 204 of computer system 202 are configured to slice/divide the sensor data of sensors 238 into blocks of sensor data (e.g., tensor slices), where the different blocks correspond to different groups/periods of time for measurements taken by sensors 238. At block 406, software applications 204 of computer system 202 are configured to use the blocks of sensor data (e.g., tensor slices) for different groups/periods of time as input to a model 306 that is configured to determine a synthetic/estimated quality measurement for manufacturing system 230. The synthetic/estimated quality measurement is generated at a higher frequency than the measurement of quality measurement 250. In other words, the synthetic/estimated quality measurement is generated more often than the measurement taken for quality measurement 250. This synthetic/estimated quality measurement also has less lag and/or delay than the quality measurement 250 which is a physical measurement.

At block 408, software applications 204 of computer system 202 are configured to check whether the synthetic/estimated quality measurement is within a normal range for manufacturing system 230. The normal range is predetermined in advance. The normal range can have a bottom limit and an upper limit, and the synthetic/estimated quality measurement is supposed to remain within the bottom and upper limits to be considered normal. If the synthetic/estimated quality measurement is within ("YES") the normal range, flow proceeds to block 402 for continued monitoring. Continued monitoring includes continuous generation of synthetic/estimated quality measurements. If synthetic/estimated quality measurement is outside ("NO") the normal range, software applications 204 are configured to issue advance warning (e.g., notification 280) based on one or more synthetic/estimated quality measurements falling outside the normal range. For example, software applications 204 can issue a warning to control application 242 of control system 240 and to an operator. The advance warning is an early indicator that there is a problem in the manufacturing system 230, including a potential problem with the sample in sample container 252, prior to the period of time "T" for taking the quality measurement 250 of the sample in sample container 252.

At block 410, software applications 204 of computer system 202 are configured to cause one or more set points 236 and/or one or more control components 234 to be modified in manufacturing system 230. In one or more embodiments, software applications 204 could cause, instruct, and/or request a change of one or more set points 236 and/or one or more control components 234. In one or more embodiments, software applications 204 can communicate a request (and/or notification 280) to control systems 240 such that the request causes control application 242 of control system 240 to modify set points 236 and/or control components 234. In one or more embodiments, software applications 204 can cause a value, operation, and/or function associated with one or more set points 236 and/or one or more control components 234 to be increased and/or decreased because of the notification 280.

Consequently, operation of manufacturing system 230 is improved and errors can be avoided based on notification 280 which is the advance warning. The synthetic/estimated quality measurements are generated using model 306 at a shorter interval and/or shorter time period than the measurement of quality measurement 250. Therefore, the synthetic/estimated quality measurements generated using sensor data of sensors 238 provide an early indication about the target sample collected in sample container 252, prior to the normal quality measurement 250. As noted herein, quality measurement 250 is a delayed time aggregate based on the sample collected in sample container 252, while the synthetic/estimated quality measurement is an instantaneous representation of the sample at any point in time which is smaller than the time "T" for taking/measuring the quality measurement 250. Accordingly, using the synthetic/estimated quality measurements at different points in time, software applications 204 are configured to generate/infer more granular information regarding the true quality measurement 250 to enable early identification of potential issues in manufacturing system 230 and thereby provide mitigation.

Figure 5:
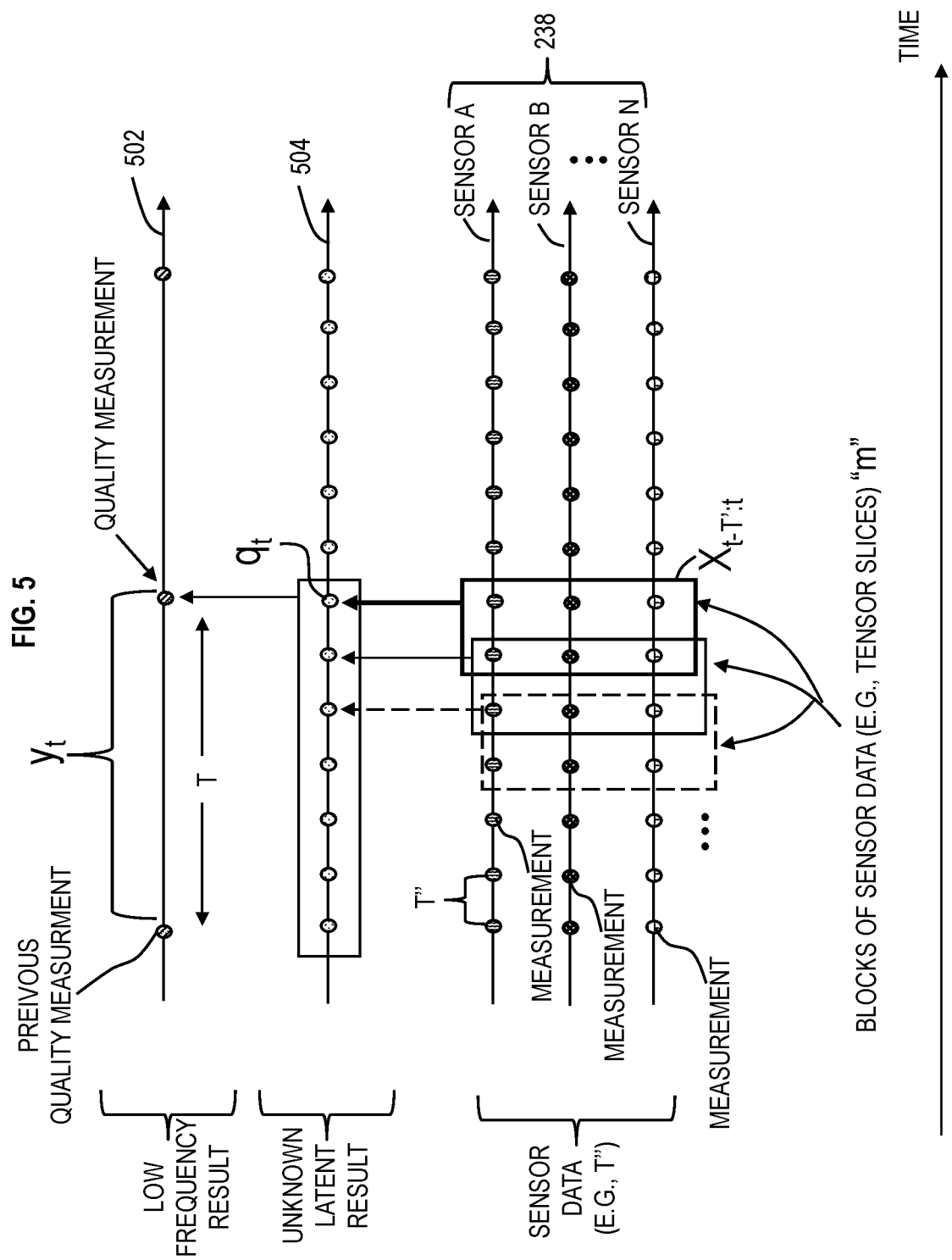
FIG. 5 depicts a diagram of modeling an instantaneous quality of an unknown latent measurement in a measurement system in accordance with one or more embodiments of the present invention.

FIG. 5 is a block diagram modeling the instantaneous quality of an unknown latent measurement in manufacturing system 230 in accordance with one or more embodiments of the invention. The unknown latent measurement is used to generate the synthetic/estimated quality measurement. Model 306 is a physics-based model related to manufacturing system 230. In FIG. 5, individual measurements/readings of different sensors 238 are shown by individual circles along timelines. Each measurement/reading of sensors 238 is taken at an instance in time that is smaller than the time between measurements taken for quality measurement 250. Circles on timeline 502 represent quality measurements 250 taken every interval or period of time "T". For illustration purposes, sensors 238 can include sensor A, sensor B, through sensor N, where N represents the last sensor, and each sensor has a plurality of measurements on a timeline. Each circle on timeline 504 is an unknown latent result that can provide additional knowledge of the manufacturing system 230. Circles on timeline 504 are not measured in manufacturing system 230 but are derived from the relationship between sensor data of sensors 238 and quality measurement 250.

When training model 306, software applications 204 use historical data 310 (e.g., stored in memory 308) to learn the relationship between sensor data of sensors 238 and quality measurement 250 for the same period of time "T", and this process is continuously repeated. Historical data 310 includes historical sensor data of sensors 238 and historical quality measurements 250, which are aligned in time. Historical data 310 stored in a database can be representative of numerous databases. The database can contain hundreds, thousands, and/or millions of documents, also referred to as "big data". In accordance with one or more embodiments, the enormous size of historical data 310 in databases requires management, processing, and search by a machine (such as computer system 202), for example, using computer-executable instructions, and historical data 310 in databases could not be practically managed, stored, analyzed, and/or processed as discussed herein within the human mind.

When training model 306, software applications 204 are configured to fit a regression model that relates high-frequency covariates (which are individual measurements of sensor data for sensors 238) over the measurement period "T" to the delayed low frequency measurements 250 (e.g., delayed low frequency (lab) results) through the unknown intermediate quality results on timeline 504. For illustration purposes, y is the symbol indicating quality measurement 250 where $y_t$ indicates the value of the quality measurement 250 at time t. The unknown intermediate quality results at time t are expressed as $q_t = f(X_{t-T}:t)$ with an initially unknown relationship f( ) and unknown output. The function $y_t = g(q_{t-T}:t)$ has a known relationship and unknown input (e.g., unknown input q over the time period t–T to t). Model 306 learns the function f( ) and uses f( ) later during prediction. In one or more embodiments, the function g( ) is known, since the quality measurements 250 are based on equal volumes sampled uniformly over time, and in this case, the model 306 is considering the average quality over the observation window "T". In this case, the final sample in sample container 252 sent off for measurement consists of a uniform mixture of samples over time, and the target measurement results in an average measurement of the quality.

During training, the sensor data (i.e., measurements/readings) of sensors 238 is aligned to match the period of time "T" over which samples are collected in sample container 252, where quality measurement 250 is taken of the collected samples in sample container 252. Each quality measurement 250 is taken of collected samples in sample container 252, and the sample data of sensors 238 is used over the same period of time "T". Once the model 306 is trained, model 306 can be used to generate synthetic/estimated quality measurements (e.g., a synthetic y) at time intervals smaller than period of time "T" for each quality measurement 250. Software applications 204 can apply (trained) model 306 to a different number of (possibly overlapping) length T' windows of the covariates to predict unknown intermediate results $q_t$, and then process those intermediate results ($q_t$) to produce an average quality measurement which is a synthetic/estimated average quality measurement for a particular time interval/window smaller than that of the original quality measurement 250 (T). As noted herein, this is particularly useful in providing more timely warnings to the system operator of manufacturing system 230. In FIG. 5, one or more blocks of sensor data (e.g., tensor slices) can be utilized to generate a synthetic/estimated quality measurement for any desired or given time window. Various regression models can be utilized to implement model 306.

Figure 6:
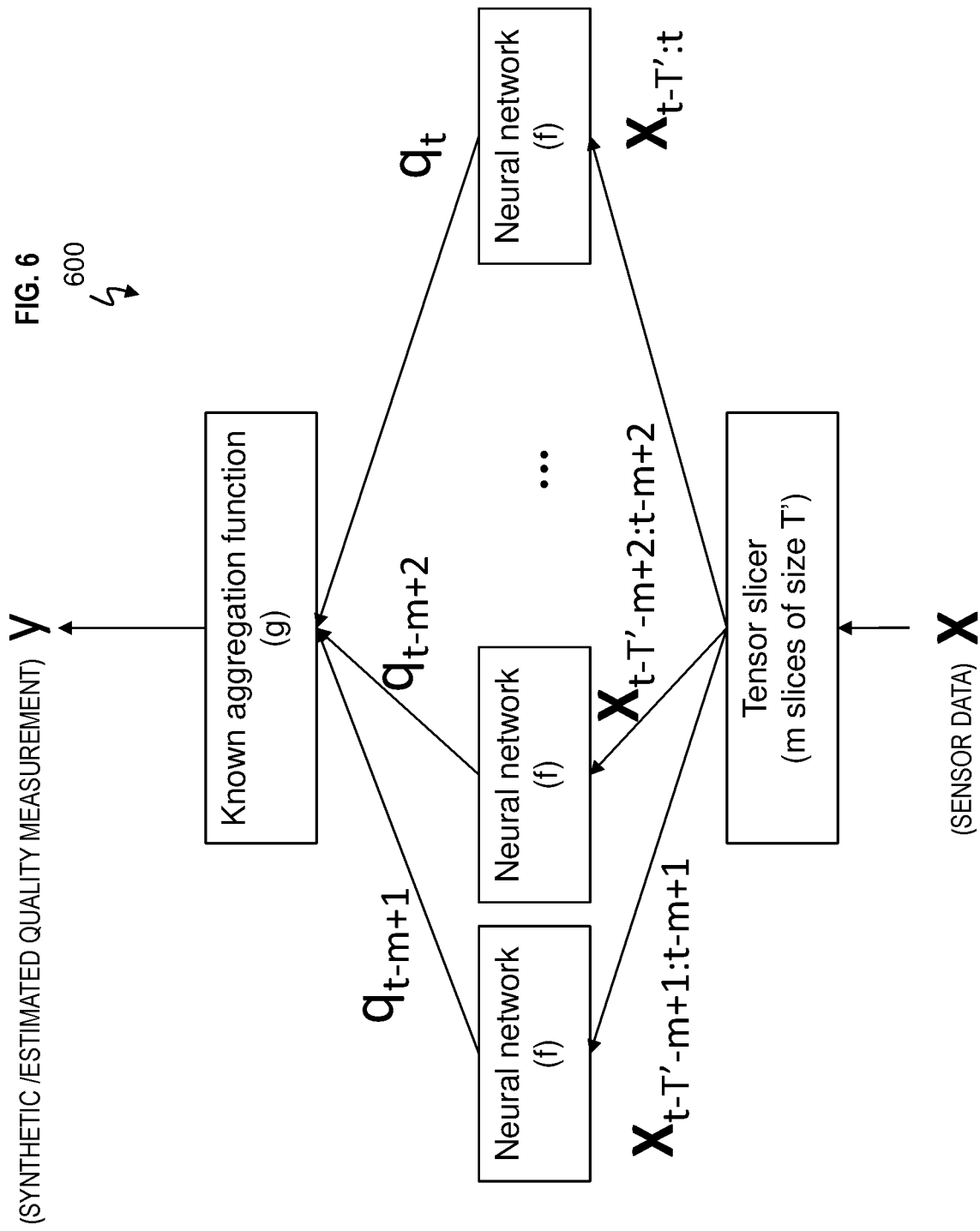
FIG. 6 depicts an example representation of a model architecture for a model in accordance with one or more embodiments of the invention.

FIG. 6 is an example representation of a model architecture 600 for model 306 in accordance with one or more embodiments of the invention. FIG. 6 illustrates use of a neural network. Blocks of sensor data from sensors 238, represented by "X", are input to model 306 for a total of "m" blocks. The blocks of sensor data are grouped according to their matching batches/groups of time. The sensor data from multiple sensors 238 are combined in each block. The blocks can be viewed as matrices (e.g., $2^{nd}$ order tensors), in each of these matrices, in which the columns consist of individual sensors with each row a separate time point. For example, one block of sensor data (e.g., tensor slice) could be $X_{t-T'-m+1:t-m+1}$, another block of sensor data could be $X_{t-T'-m+2:t-m+2}$, through the block of sensor data which is $X_{t-T':t}$. As noted herein, measurements of the sensor data occur in increments of time T", and "m" is the number of blocks of sensor data (e.g., tensor slices) used to generate a single synthetic/estimated quality measurement for time "t" which is a time instant generally used to refer to the present time. Referring to FIG. 6, each block of sensor data is input into its own copy of the neural network which represents the function f( ). The multiple neural networks are identical copies of the same trained neural network, which is responsible for implementing and/or capturing the local dynamics as discussed herein. After inputting each block of sensor data into the function f( ) for the copies of neural networks, the copies of neural networks output the unknown intermediate quality results q which is a $q_t$ for each neural network. For example, for the neural networks receiving respective blocks of sensor data, one neural network could generate $q_{t-m+1}$, another neural network could generate $q_{t-m+2}$, through the last neural network generating $q_t$. A known aggregate function g( ) is utilized to aggregate the output from the copies of neural networks. The output "y" of the known aggregate function g( ) is a single synthetic/estimated quality measurement of manufacturing system 230, for a given instance in time "t", where the synthetic/estimated quality measurement represents the status/state of manufacturing system 230. The output of g( ) is the quality over the time period T (i.e., the aggregate measurement of quality over the time period from t–T to t). Software applications 204 can utilize model 306 to generate synthetic/estimated quality measurements for different instances in time "t" which can be smaller intervals than the period of time "T" utilized for quality measurement 250.

Quality measurement 250 can be considered the measurement of a process variable. Sensor data of sensors 238 can be considered covariates and/or other process variables different from the process variable. Using model 306, the non-instantaneous nature of the process variable's measurement takes a general form of a time-aggregated measurement, whose time-resolution and value correspond to an aggregation over an interval of time using a general aggregation function (e.g., function g( ) of the variable's instantaneous values over that interval, as opposed to the case of instantaneous on-line and/or off-line measurements, whose time-resolution and value correspond to a point-in-time.

The process variable (e.g., corresponding to quality measurement 250) under question is a quality-related variable corresponding to a physical material process outflow stream, whose measurements are available infrequently from a laboratory; the non-instantaneous, time-aggregated nature of the quality measurement is specifically due to mixing/aggregating equal sampled volumes (e.g., into sample container 252) that are drawn at multiple instants in time over a long duration from the corresponding process outflow stream and subsequently performing a composite measurement on the aggregated total volume. As learned by model 206, the non-instantaneous, time-aggregated nature of quality measurement 250 is due to any specified general aggregation function that is applied over each aggregation interval corresponding to historical process variable measurements (historical data 310) as the relationship determined in model 306. The non-instantaneous, time-aggregated nature of quality measurement 250 is due to an unspecified, general aggregation function that is uniformly applied over each aggregation interval corresponding to historical process variable measurements, and which is automatically learned by model 306 from the historical data 310.

The continuous monitoring of the process variable for quality measurement 250 is done by automatically estimating its instantaneous, point-in-time value (e.g., the values for $q_t$) using model 306. The relationship used to generate the point-in-time value (e.g., synthetic/estimated quality measurement) is automatically learned from historical data by reconstructing the set of infrequent, time-interval aggregated historical ground truth measurements: by first constructing the unobserved, latent, point in time, instantaneous values (e.g., the values for $q_t$) for the process variable over corresponding time-intervals, and the transforming these latent estimates (e.g., the values for $q_t$) using the general aggregation function (e.g., function g( )). The point in time, latent estimates of the process variable at any instant are a consequence of model 306 that uses as inputs the values of all covariates (e.g., blocks of sensor data of sensors 238) over a window of historical process influence, relative to each such instant in time, where the length of this window (e.g., time "T' ") is chosen as a model hyperparameter, independent of the duration (e.g., period of time "T") between consecutive (infrequent) measurements of the process variable.

As depicted in FIG. 6, the model 306 can be a neural network with multiple layers of nonlinear activation functions, weights, and biases, where model 306 uses as inputs both the raw values of all covariates (e.g., sensor data) over the window of historical process influence (e.g., time "T' "), as well as various time-series features over the sequence of historical covariate values in this window including mean, standard deviation, kurtosis, variance, etc. The automatic learning of the general aggregation function (e.g., function g( ) is done with a neural network with multiple layers of nonlinear activation functions, weights, and biases, and the general aggregation function (e.g., function g( )) uses as inputs the point-in-time latent estimates (e.g., values of $q_t$ such as $q_{t-m+1}$, $q_{t-m+2}$, through $q_t$).

Technical benefits and advantages include a system and method which have better alignment with the underlying physics of the manufacturing process, in accordance with one or more embodiments. The estimated latent quality result (e.g., $q_t$) depends on sensor measurements over a shorter time horizon. The estimated quality result (e.g., $q_t$) effectively summarizes the local behavior of the process in a way that can be accurately used to capture the longer-term dynamics present in average quality measurement, and therefore, the estimated quality result (e.g., $q_t$) is used to generate the synthetic/estimated quality measurement. Knowledge of the latent quality result allows formulating other time averages that may be more beneficial for ensuring the behavior of the process rather than a long-term average.

Figure 7:
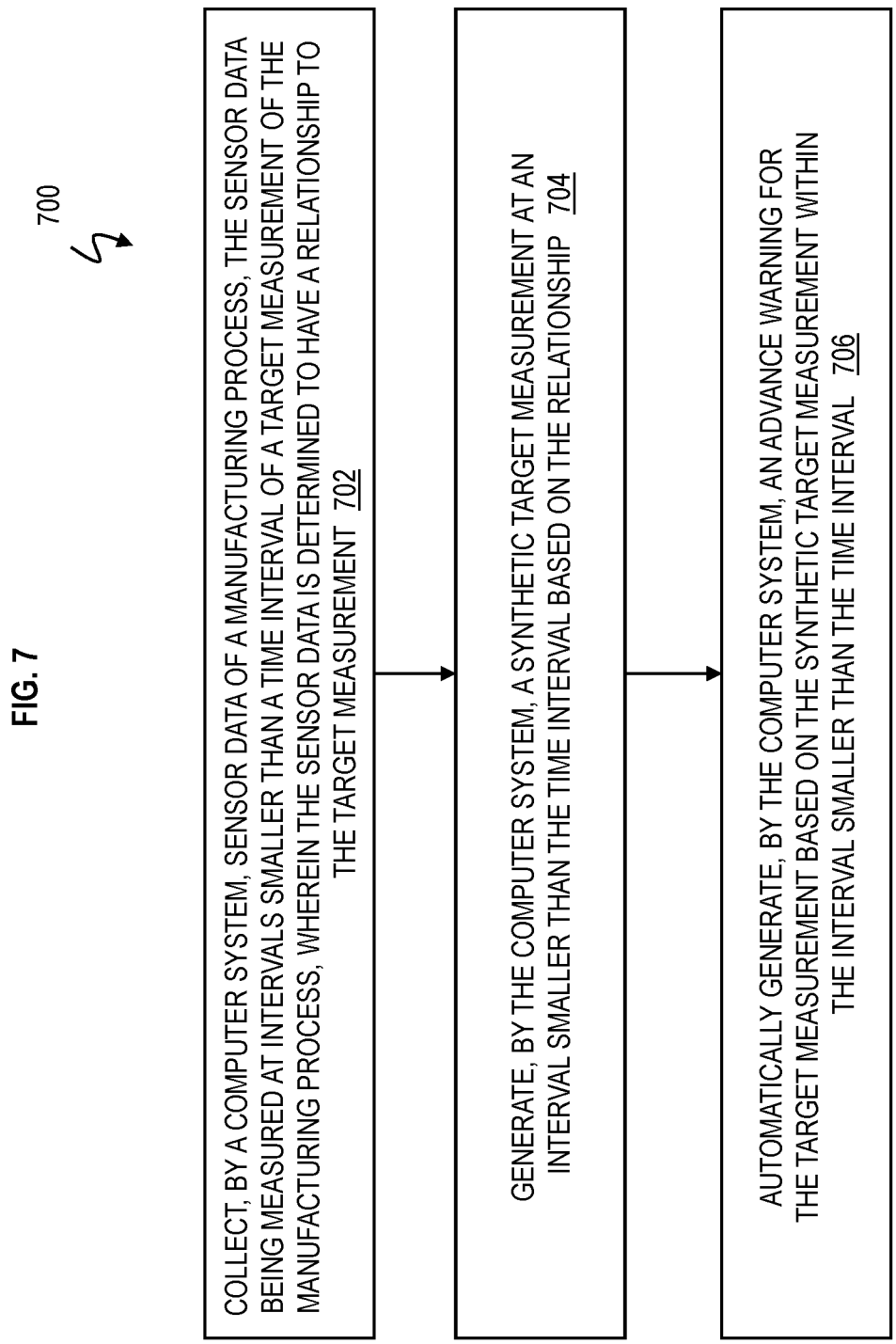
FIG. 7 is a flowchart of a computer-implemented method for providing continuous monitoring, advance alerts, and control of process key performance indicator variables that have infrequent and time-aggregated measurements in a manufacturing system in accordance with one or more embodiments of the present invention.

FIG. 7 is a flowchart of a computer-implemented process 700 for providing continuous monitoring, advance alerts, and control of process key performance indicator variables that have infrequent and time-aggregated measurements in a manufacturing system 230 in accordance with one or more embodiments of the present invention. The computer-implemented process 700 in FIG. 7 can be implemented using system 200 shown in FIG. 2, along with discussions in FIGS. 3-6.

At block 702, software applications 204 on computer system 202 are configured to collect sensor data of a manufacturing system 230, the sensor data being measured at intervals (e.g., time "T") smaller than a time interval (e.g., period of time "T") of a target measurement (e.g., quality measurement 250) of the manufacturing system 230, wherein the sensor data is determined to have a relationship to the target measurement (e.g., quality measurement 250). For example, software applications 204 can collect sensor data of sensors 238 from control systems 240 and/or directly from sensors 238.

At block 704, software applications 204 on computer system 202 are configured to generate a synthetic target measurement at an interval (e.g., time "T' ") smaller than the time interval (e.g., period of time "T") based on the relationship. For example, the relationship may include the relationship between function f( ) function g( ), and quality measurement 250, where blocks of sensor data ("X") are used as the input. Model 306 can be used to generate synthetic target measurement for a given time to represent quality measurement 250.

At block 706, software applications 204 on computer system 202 are configured to automatically generate an advance warning (e.g., notification 280) for the target measurement based on the synthetic target measurement within the interval smaller than the time interval (e.g., time "T").

One or more set points 236 associated with the manufacturing system 230 are automatically revised in response to the advance warning (e.g., notification 280) for the target measurement based on the synthetic target measurement. One or more control components 234 associated with the manufacturing system 230 are automatically revised in response to the advance warning (e.g., notification 280) for the target measurement based on the synthetic target measurement. The advance warning (e.g., notification 280) is generated (by computer system 202) because the synthetic target measurement is outside a predetermined range (e.g., normal range determined in advance). Modifications are made to the manufacturing system 230 (e.g., as caused and/or instructed by computer system 202) to bring the synthetic target measurement within a predetermined range.

The target measurement (e.g., quality measurement 250) is a quality-related variable corresponding to a physical material process outflow stream of the manufacturing system 230, the target measurement including a non-instantaneous, time-aggregated nature due to mixing equal sampled volumes in a vessel (e.g., sample container 252) where the equal sampled volumes are collected at multiple instants in time throughout the time interval (e.g., period of time "T") and measured at an end of the time interval, thereby obtaining the target measurement (e.g., quality measurement 250).

The target measurement (e.g., quality measurement 250) is a composite measurement on an aggregated total volume of a sample (e.g., collected in sample container 252). The synthetic target measurement is a generated value for a point in time based on the sensor data and is not a measurement of the aggregated total volume of the sample, but rather the synthetic target measurement represents a state of an individual sampled volume at the point in time within the time interval.

The target measurement (e.g., quality measurement 250) is a composite measurement of an aggregated total volume of a sample (e.g., collected in sample container 252). An aggregation function (e.g., aggregation function g( )) that produces the composite target measurement from the equal sampled volumes that make up the aggregated total volume is unknown and is learned automatically as a function of the target measurement across the equal sampled volumes. For known aggregation function (g( )), since in this case the function is known, the training process incorporates this information, as depicted in FIG. 6 as previously discussed herein. In one or more embodiments, there can be an unknown aggregation function (i.e., aggregation function (g( )) is unknown), and in such cases, g( ) may be unknown to the system designer/engineer. As such, software applications 204 and/or model 306 on computer system 202 are configured to also learn g( ) in the process. In this case, the aggregate function g( ) in FIG. 6 is replaced by another neural network whose parameters need to be learned. The synthetic target measurement (e.g., via model 306 of software applications 204) is a generated value for a point in time based on the sensor data (e.g., of manufacturing system 230) and is not a measurement of the aggregated total volume of the sample, the synthetic target measurement representing a state of an individual sampled volume of the equal sampled volumes (e.g., collected in sample container 252) at the point in time within the time interval (e.g., period of time "T"). It is noted that the synthetic target measurement is synthetic in the sense that it is based on the output of the learned model (f( ). This could be a point in time measurement (i.e., instantaneous quality) and/or a new aggregate produced at a finer granularity (i.e., 1-hour average quality). In one case, the point in time measurement could corelate (e.g., coincide or nearly coincide) to the time for an individual sampled volume, thereby providing insight to what occurred in the manufacturing system 230 and/or the state at that time.

The target measurement (e.g., quality measurement 250) is a composite measurement of an aggregated total volume of a sample (e.g., collected in sample container 252). An aggregation function (e.g., aggregation function g( )) that produces the composite target measurement from the equal sampled volumes that make up the aggregated total volume is known to be an average of the target measurement across the equal sampled volumes. The synthetic target measurement (e.g., via model 306 of software applications 204) is a generated value for a point in time based on the sensor data and is not a measurement of the aggregated total volume of the sample, the synthetic target measurement representing a state of an individual sampled volume of the equal sampled volumes at the point in time within the time interval (e.g., period of time "T").

The target measurement (e.g., quality measurement 250) is a composite measurement of an aggregated total volume of a sample (e.g., collected in sample container 252). The aggregation function (e.g., aggregation function g( )) that produces the composite target measurement from the equal sampled volumes that make up the aggregated total volume is known from a user-specified function of the target measurement across the equal sampled volumes. The synthetic target measurement (e.g., via model 306 of software applications 204) is a generated value for a point in time based on the sensor data and is not a measurement of the aggregated total volume of the sample, the synthetic target measurement representing a state of an individual sampled volume of the equal sampled volumes at the point in time within the time interval (e.g., period of time "T").

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
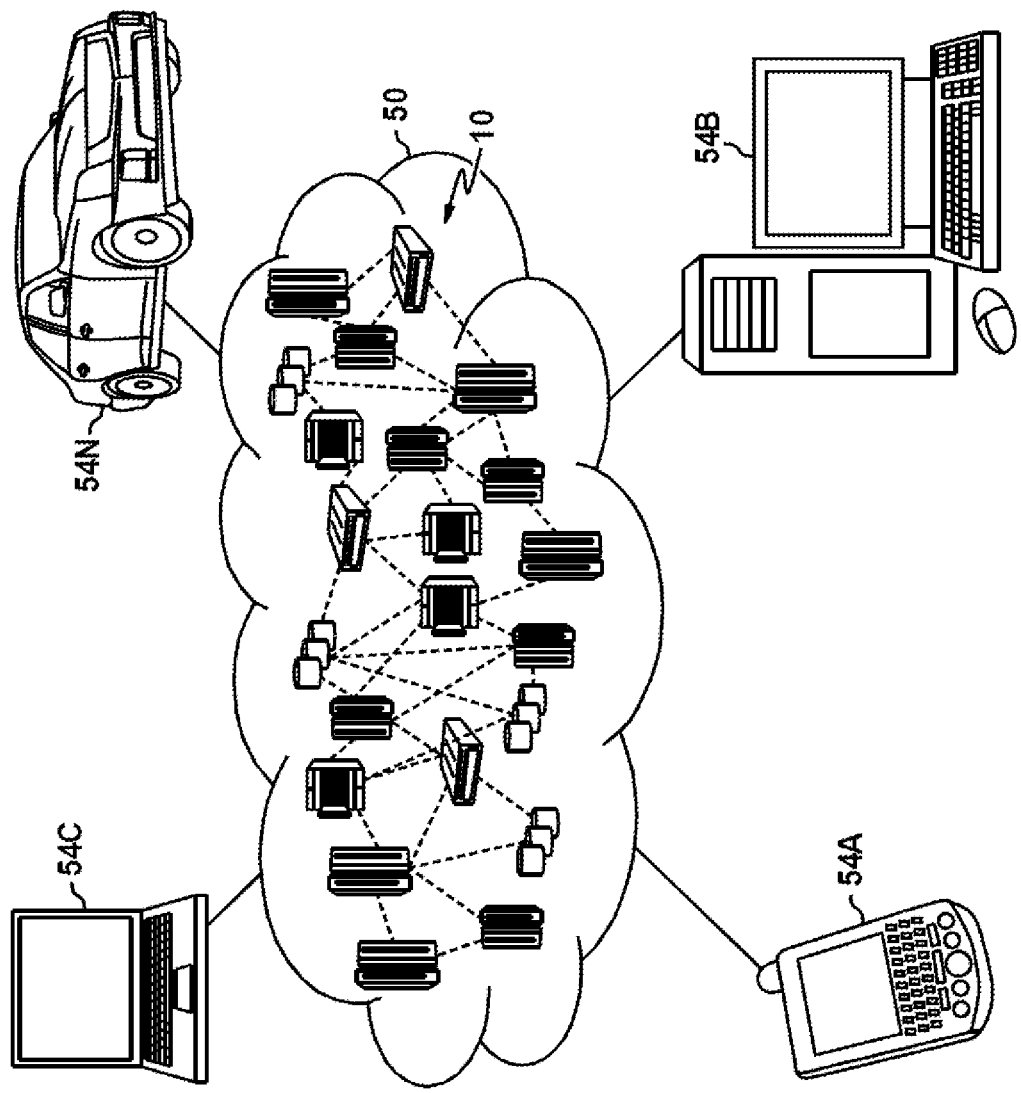
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
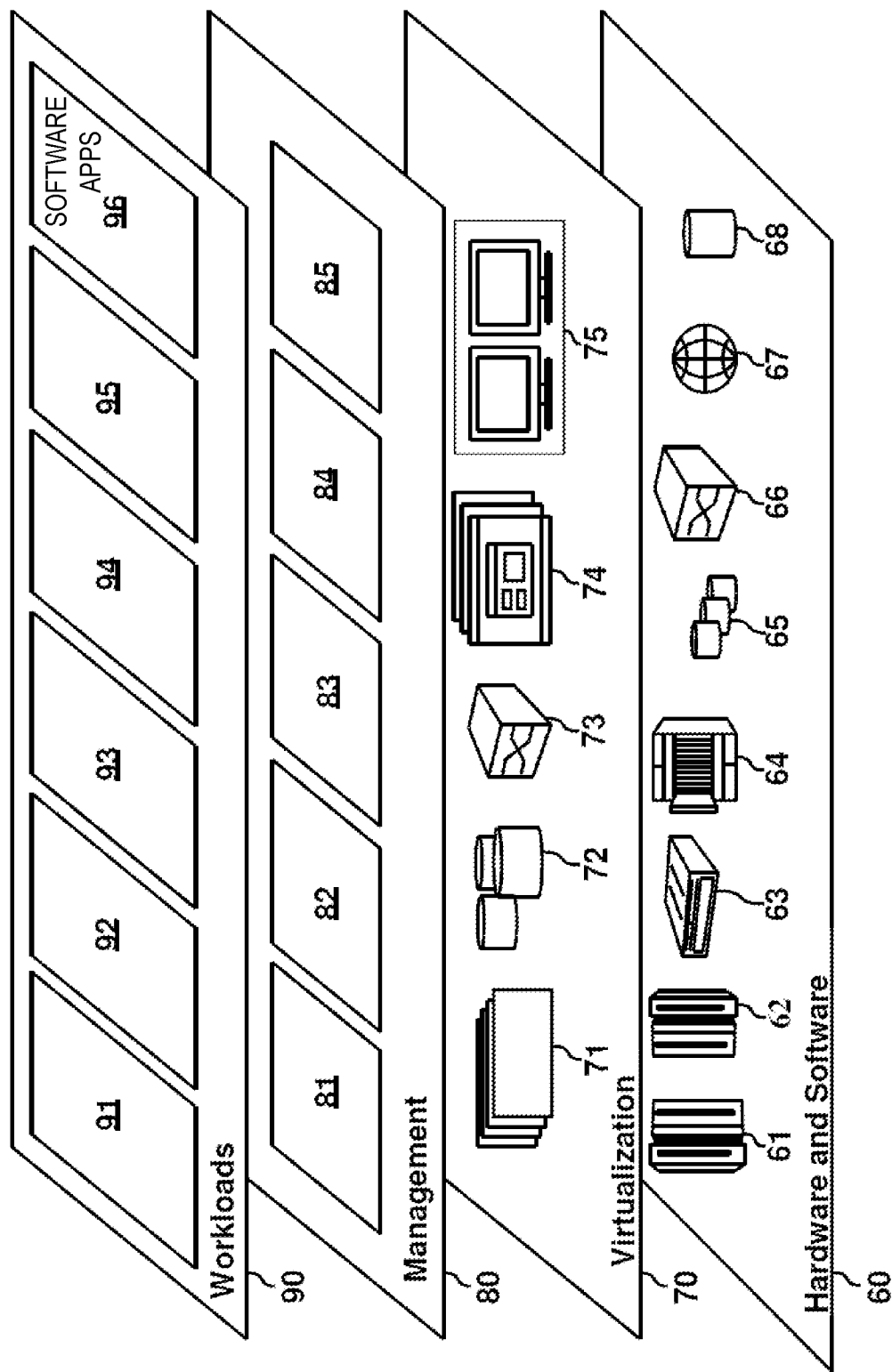
FIG. 9 depicts abstraction model layers according to one or more embodiments of the present invention.

Referring now to FIG. 9, a set of functional abstraction layers provided by cloud computing environment 50 (FIG.

8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications (e.g., software applications 204, control applications 242, model 306, etc.) implemented in workloads and functions 96.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   collecting, by a computer system, sensor data of a manufacturing system, the sensor data being measured at a plurality of intervals smaller than a time interval "T" of a target measurement of the manufacturing system, wherein the sensor data is determined to have a relationship to the target measurement;
   generating, by the computer system, a synthetic target measurement at a first interval of the plurality of intervals based on the relationship, the first interval being smaller than the time interval "T", wherein the computer system employs a machine learning model to generate the synthetic target measurement, the machine learning model comprising a neural network trained on training data comprising historical sensor data and historical target measurement data, wherein training the machine learning model comprises fitting a regression model that relates the sensor data being measured at the plurality of intervals to the historical target measurement data at the time interval "T" through unknown intermediate quality results in which the historical target measurement data are based on equal volumes sampled uniformly over time;
   automatically generating, by the computer system, an advance warning for the target measurement based on the synthetic target measurement within the interval smaller than the time interval; and
   causing a control system of the manufacturing system to change operation of an actuator in response to the advance warning.

2. The computer-implemented method of claim 1, wherein one or more set points associated with the manufacturing system are automatically revised in response to the advance warning for the target measurement based on the synthetic target measurement.

3. The computer-implemented method of claim 1, wherein the advance warning is generated in response to the synthetic target measurement being outside a predetermined range.

4. The computer-implemented method of claim 1, wherein modifications are made to the manufacturing system to bring the synthetic target measurement within a predetermined range.

5. The computer-implemented method of claim 1, wherein the target measurement is a quality-related variable corresponding to a physical material process outflow stream of the manufacturing system, the target measurement comprising a non-instantaneous, time-aggregated nature due to mixing equal sampled volumes in a vessel where the equal sampled volumes are collected at multiple instants in time throughout the time interval and measured at an end of the time interval, thereby obtaining the target measurement.

6. The computer-implemented method of claim 5, wherein:
   the target measurement is a composite measurement of an aggregated total volume of a sample; and
   the synthetic target measurement is a generated value for a point in time based on the sensor data and is not a measurement of the aggregated total volume of the sample, the synthetic target measurement representing a state of an individual sampled volume at the point in time within the time interval.

7. The computer-implemented method of claim 5, wherein:
   the target measurement is a composite measurement of an aggregated total volume of a sample;
   an aggregation function that produces the composite measurement from the equal sampled volumes that make up the aggregated total volume is unknown and is learned automatically as a function of the target measurement across the equal sampled volumes; and
   the synthetic target measurement is a generated value for a point in time based on the sensor data and is not a measurement of the aggregated total volume of the sample, the synthetic target measurement representing a state of an individual sampled volume of the equal sampled volumes at the point in time within the time interval.

8. The computer-implemented method of claim 5, wherein:
   the target measurement is a composite measurement of an aggregated total volume of a sample;
   an aggregation function that produces the composite measurement from the equal sampled volumes that make up the aggregated total volume is known to be an average of the target measurement across the equal sampled volumes; and
   the synthetic target measurement is a generated value for a point in time based on the sensor data and is not a measurement of the aggregated total volume of the sample, the synthetic target measurement representing a state of an individual sampled volume of the equal sampled volumes at the point in time within the time interval.

9. The computer-implemented method of claim 5, wherein:
   the target measurement is a composite measurement of an aggregated total volume of a sample;
   an aggregation function that produces the composite measurement from the equal sampled volumes that make up the aggregated total volume is known from a user-specified function of the target measurement across the equal sampled volumes; and the synthetic target measurement is a generated value for a point in time based on the sensor data and is not a measurement of the aggregated total volume of the sample, the synthetic target measurement representing a state of an individual sampled volume of the equal sampled volumes at the point in time within the time interval.

10. A system comprising:

a non-transitory memory having computer readable instructions; and one or more processors for executing the computer readable instructions, the computer readable instructions controlling the one or more processors to perform operations comprising:

collecting sensor data of a manufacturing system, the sensor data being measured at a plurality of intervals smaller than a time interval "T" of a target measurement of the manufacturing system, wherein the sensor data is determined to have a relationship to the target measurement;

generating a synthetic target measurement at a first interval of the plurality of intervals based on the relationship, the first interval being smaller than the time interval "T", wherein the computer system employs a machine learning model to generate the synthetic target measurement, the machine learning model comprising a neural network trained on training data comprising historical sensor data and historical target measurement data, wherein training the machine learning model comprises fitting a regression model that relates the sensor data being measured at the plurality of intervals to the historical target measurement data at the time interval "T" through unknown intermediate quality results in which the historical target measurement data are based on equal volumes sampled uniformly over time;

automatically generating an advance warning for the target measurement based on the synthetic target measurement within the interval smaller than the time interval; and causing a control system of the manufacturing system to change operation of an actuator in response to the advance warning.

11. The system of claim 10, wherein one or more set points associated with the manufacturing system are automatically revised in response to the advance warning for the target measurement based on the synthetic target measurement.

12. The system of claim 10, wherein the advance warning is generated in response to the synthetic target measurement being outside a predetermined range.

13. The system of claim 10, wherein modifications are made to the manufacturing system to bring the synthetic target measurement within a predetermined range.

14. The system of claim 10, wherein the target measurement is a quality-related variable corresponding to a physical material process outflow stream of the manufacturing system, the target measurement comprising a non-instantaneous, time-aggregated nature due to mixing equal sampled volumes in a vessel where the equal sampled volumes are collected at multiple instants in time throughout the time interval and measured at an end of the time interval, thereby obtaining the target measurement.

15. The system of claim 14, wherein:

the target measurement is a composite measurement of an aggregated total volume of a sample; and the synthetic target measurement is a generated value for a point in time based on the sensor data and is not a measurement of the aggregated total volume of the sample, the synthetic target measurement representing a state of an individual sampled volume at the point in time within the time interval.

16. A computer program product comprising a non-transitory computer readable storage medium having program instructions embodied therewith, the program instructions executable by a processor to cause the processor to perform operations comprising:

collecting sensor data of a manufacturing system, the sensor data being measured at a plurality of intervals smaller than a time interval "T" of a target measurement of the manufacturing system, wherein the sensor data is determined to have a relationship to the target measurement;

generating a synthetic target measurement at a first interval of the plurality of intervals based on the relationship, the first interval being smaller than the time interval "T", wherein the computer system employs a machine learning model to generate the synthetic target measurement, the machine learning model comprising a neural network trained on training data comprising historical sensor data and historical target measurement data, wherein training the machine learning model comprises fitting a regression model that relates the sensor data being measured at the plurality of intervals to the historical target measurement data at the time interval "T" through unknown intermediate quality results in which the historical target measurement data are based on equal volumes sampled uniformly over time;

automatically generating an advance warning for the target measurement based on the synthetic target measurement within the interval smaller than the time interval; and causing a control system of the manufacturing system to change operation of an actuator in response to the advance warning.

17. The computer program product of claim 16, wherein one or more set points associated with the manufacturing system are automatically revised in response to the advance warning for the target measurement based on the synthetic target measurement.

* * * * *